United States Patent
Gabriel et al.

(10) Patent No.: US 8,938,521 B2
(45) Date of Patent: Jan. 20, 2015

(54) BI-DIRECTIONAL SYNCHRONIZATION ENABLING ACTIVE-ACTIVE REDUNDANCY FOR LOAD-BALANCING SWITCHES

(75) Inventors: Cynthia A. Gabriel, Gilroy, CA (US); Bill Shao, Pleasanton, CA (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 269 days.

(21) Appl. No.: 13/598,417

(22) Filed: Aug. 29, 2012

(65) Prior Publication Data

US 2014/0067983 A1   Mar. 6, 2014

(51) Int. Cl.
*G06F 15/16* (2006.01)
*G06F 12/00* (2006.01)

(52) U.S. Cl.
USPC .......................................... 709/219; 709/250

(58) Field of Classification Search
USPC .................. 709/217–219, 203, 223–229, 250
See application file for complete search history.

(56) References Cited

U.S. PATENT DOCUMENTS

| | | | |
|---|---|---|---|
| 6,715,098 B2 | 3/2004 | Chen et al. | |
| 6,983,363 B2 | 1/2006 | Coffey | |
| 7,138,733 B2 | 11/2006 | Sanders et al. | |
| 7,627,780 B2 | 12/2009 | Davies | |
| 2003/0200330 A1 | 10/2003 | Oelke et al. | |
| 2005/0066060 A1* | 3/2005 | Pinkerton et al. | 709/249 |
| 2006/0195532 A1* | 8/2006 | Zlateff et al. | 709/206 |
| 2010/0281178 A1* | 11/2010 | Sullivan | 709/231 |
| 2011/0283013 A1* | 11/2011 | Grosser et al. | 709/232 |
| 2012/0047249 A1 | 2/2012 | Bharadwaj et al. | |
| 2012/0150819 A1* | 6/2012 | Lindahl et al. | 707/687 |
| 2013/0332555 A1* | 12/2013 | Gabriel et al. | 709/208 |

* cited by examiner

*Primary Examiner* — Zarni Maung

(57) ABSTRACT

A network element within a data center comprises a master switch, a slave switch, a plurality of servers in communication with the master and slave switches, and an inter-switch link connected between the master switch and the slave switch. The master switch and the slave switch are configured to bi-directionally synchronize both server status and application hash table information through the inter-switch link.

3 Claims, 6 Drawing Sheets

BI-DIRECTIONAL SYNCHRONIZATION ENABLING ACTIVE-ACTIVE REDUNDANCY FOR LOAD-BALANCING SWITCHES

BACKGROUND

The present invention relates to data processing, and more specifically, to bi-directional synchronization of load balancing switches.

Data centers are generally centralized facilities that provide Internet and intranet services needed to support businesses and organizations. A typical data center can house various types of electronic equipment, such as computers, servers (e.g., email servers, proxy servers, and DNS servers), switches, routers, data storage devices, and other associated components. In addition, data centers typically deploy network security components, such as firewalls, VPN (virtual private network) gateways, and intrusion detection systems.

The data center may employ a network element consisting of both an ingress switch and an egress switch to handle data passing through servers. In some networking approaches, redundancy of switches may be employed as a fail-safe mechanism in case a primary switch falters. Typically, redundant switches may be configured to optimize load distribution of data traffic on servers. Under an Active-Passive scheme, the redundant switch may be operated only when its associated primary switch fails. This may be considered inefficient because the redundant component is idle most of the time. Under an Active-Active scheme, the primary switch and redundant switch may be operated simultaneously. To optimize efficient load balancing, health checks may be sent from the switches to the servers to determine their status and synchronization of the primary and redundant switches may be performed to update the switches in response to failed interfaces with the servers.

Some types of health check requests under an Active-Active scheme may be sent from the switch directly to a server. Upon receiving a health check request, the server may send a health check response back through said switch from where it was originated. This type of health check may be preferable to support a particular application being processed. However, with this method of server health checking, the primary switch may differ from the redundant component under an Active-Active environment. The totality of failed servers in the network element may not be visible from the primary switch because the primary switch may not be able to identify server interfaces failing from the redundant component side and vice versa. The local application hash table updated on the primary switch based on the server health check results on the primary switch may differ from the local application hash table updated on the redundant switch based on the server health check results on the redundant switch. Thus, improved synchronization and consolidation of both the server health check results and application hash table results between the primary and redundant switches may be beneficial for load balancing of data traffic among servers to function properly.

SUMMARY

According to one embodiment of the present invention, a network element comprises a master switch; a slave switch; a plurality of servers in communication with the master and slave switches; and an inter-switch link connected between the master switch and the slave switch, wherein the master switch and the slave switch are configured to bi-directionally synchronize both server status and application hash table information through the inter-switch link.

According to another embodiment of the present invention, a switch in a network element comprises at least one externally facing port configured to receive data; a plurality of server-facing ports configured to communicate with one or more servers; a connection configured to communicate with another switch, wherein the connection may be outside of the one or more servers or through one of the one or more servers; and a processor configured to: exchange, through the connection, server health check states with the another switch; aggregate a server health check state table constructed from available servers based on a congruence of server health check states with the another switch; update an application hash table constructed from available servers in the aggregate server health check state table, and synchronize, through the connection, the application hash table with the another switch.

According to yet another embodiment of the present invention, a computer program product to bi-directionally synchronize load balancing switches in a network element, the computer program product comprises a computer readable storage medium having computer readable program code embodied therewith, the computer readable program code being configured to: send health check requests from a master switch to a plurality of servers in a network element; build a master switch server health check state table of servers from the plurality of servers functionally communicating with the master switch; send health check requests from a slave switch to a plurality of servers in a network element; build a slave switch server health check state table of servers from the plurality of servers functionally communicating with the slave switch; send from the slave switch a copy of the slave switch server health check state table through an inter-switch link to the master switch; aggregate on the master switch the combined server health check state table results common between both the master and slave switches; update on the master switch the application hash table using available servers from the aggregate results of the server health check state table; send from the master switch a copy of the updated application hash table of healthy servers to the slave switch; and synchronize the application hash table of the slave switch to correspond with the application hash table of the master switch.

DETAILED DESCRIPTION

Figure 1:
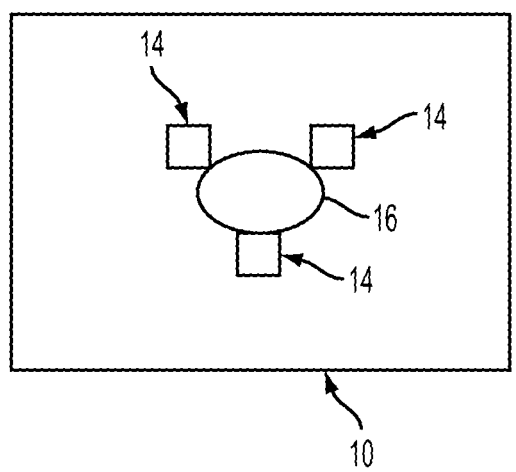
FIG. 1 is a block diagram of a networking environment including a data center with a plurality of network elements in accordance with an exemplary embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As generally described herein, the network elements of a data center employ bi-directional synchronization between the master and slave switches maintaining server health check state and application hash table state congruence while allowing a variety of health check types performed between respective switches and their connected servers. Bi-directional synchronization may include verifying that the master switch and slave switch are achieving matched load distribution by employing common healthy servers in processing applications. Bi-directional synchronization may be performed by comparing server status and application hash table information gathered independently by each switch through an inter-switch link.

Referring now to FIG. 1, the data center 10 is generally a facility that houses various computers, routers, switches, and other associated equipment in support of applications and data that are integral to the operation of a business, organization, or other entities. The data center 10 may include a plurality of network elements 14 in communication with each other over a network 16 of communication links. Each of the network elements 14 may be independent (standalone) electronic enclosures. The data center 10 can have fewer or more than the three network elements 14 shown. In addition, embodiments of the data center 10 may be at a single site or distributed among multiple sites.

Figure 2:
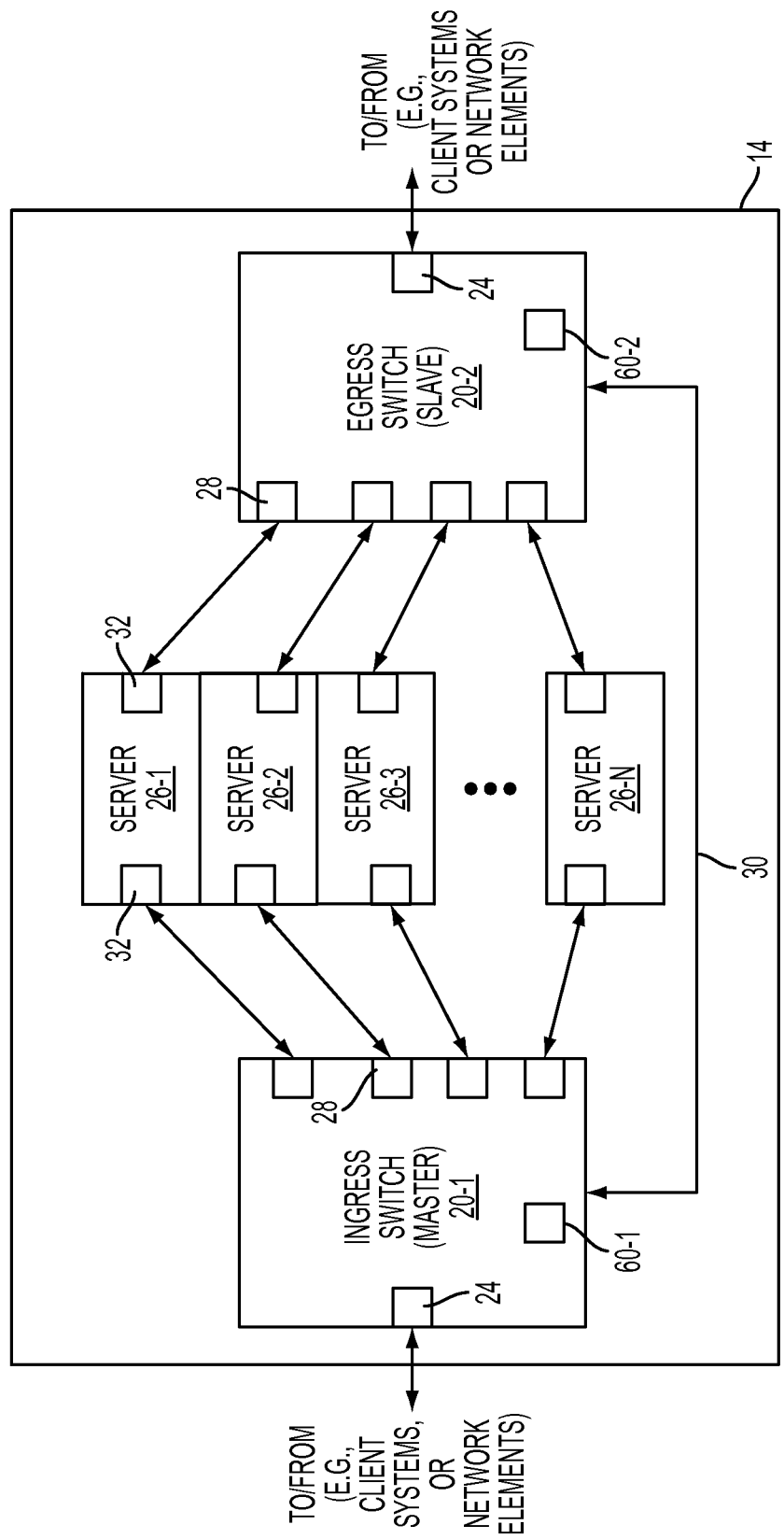
FIG. 2 is a functional block diagram of an embodiment of a network element of FIG. 1.

Referring now to FIG. 2, a network element 14 of the plurality of network elements 14 may be a system providing bi-directional data processing for packet traffic within the data center 10. The network element 14 may include a plurality of servers 26-1, 26-2, 26-3, 26-N (generally, 26). Each server 26 may be in communication with an ingress switch 20-1 and an egress switch 20-2. The ingress switch 20-1 may be referred to as the master switch; the egress switch 20-2, as the slave switch. In another aspect, the data center 10 may be configured for active-active operation where both the master switch 20-1 and slave switch 20-2 are actively processing traffic. The master switch 20-1 and the slave switch 20-2 may operate under a heterogeneous software environment. A heterogeneous software environment may be when the software is running on each switch (20-1, 20-2) independently. For example, the configuration may be the same on each switch (20-1, 20-2), but the processing order, steps, and/or timing may be different on independent switches (20-1, 20-2). A heterogeneous software environment may be when the software being executed on the different servers 26 may return information to the switch (20-1 or 20-2) under different applications, for example, different health check metrics. The master switch 20-1 may receive incoming packets, arriving either from client systems (when the master switch 20-1 is at an ingress location of the network element 14) within a data center 10 or from other network elements 14 within the data center 10, and may forward the packets to servers 26 within the network element 14. In an exemplary embodiment, the master switch 20-1 may receive packet traffic from the servers 26 and forward the packet traffic outside of the network element 14 to other network elements 14 within the data center 10. In another exemplary embodiment, the slave switch 20-2 may receive incoming packets external from the network element 14, arriving either from client systems or from other network elements 14 within the data center 10, similar to the master switch 20-1, and may forward the packets to servers 26 within the network element 14. In yet another exemplary embodiment, the slave switch 20-2 may receive packet traffic from the servers 26 and forward the packet traffic outside of the network element 14 to other network elements 14 within the data center 10.

In general, the networking element 14 may provide switching and server services for packet traffic from the client systems. Through an external management agent (not shown), an administrator of the data center 10 may communicate with one or more network elements 14 in order to manage the packet distribution. A management station (not shown) may connect directly (point-to-point) or indirectly to a given network element 14 of the data center 10 over one of a variety of connections, such as standard telephone lines, digital subscriber line (DSL), asynchronous DSL, LAN or WAN links (e.g., T1, T3), broadband connections (Frame Relay, ATM), and wireless connections (e.g., 802.11(a), 802.11(b), 802.11(g), 802.11(n)). Using a network protocol, such as Telnet or SNMP (Simple Network Management Protocol), the management station (not shown) may access a command-line interface (CLI) of the given network element 14.

Each server 26 may be a computer that provides one or more services to the data center 10, examples of which may include email servers, proxy servers, DNS servers, proxy appliances, or real servers. Examples of services that may be provided by the servers 26 include firewall services, Intrusion Prevention/Intrusion Detection (IPS/IDS) services, Server Load Balancing (SLB), and Application Delivery Centers (ADC) services. All of the servers 26 in the network element 14 may or may not perform the same function.

Each switch 20-1, 20-2 (generally, 20) may include at least one externally facing port 24 and a plurality of server-facing ports 28. In an exemplary embodiment, the switch 20 may be an Ethernet switch and the ports 24, 28 of the switch 20 may support GB line rates. For a network element 14 at an ingress location of the data center 10, the externally facing port 24 of the master switch 20-1 may be in communication with the client systems. For network elements not at an ingress location, the externally facing port 24 of the master switch 20-1 may be in communication with another network element 14. The externally facing port 24 of the slave switch 20-2 may be in communication with another network element 14 or with client systems. The master and slave switches 20 may have more than one externally facing port 24. Each of the server-facing ports 28 of the master and slave switches 20 may be connected to a port 32 of a server 26. In addition, the master switch 20-1 and the slave switch 20-2 may be in communication with each other over an inter-switch network link 30 which may be a connection through a dedicated physical path or a dynamically selected path outside of the servers 26 or through one of the server-facing ports 28. The inter-switch link 30 for example, may provide a path to send synchronization information between the master switch 20-1 and the slave switch 20-2. The inter-switch link 30 may be, for example, a wire, a bridge, or a server blade. The master switch 20-1 and the slave switch 20-2 may operate independently of each other populating their respective application hash tables with information from their respective server health check states or operate jointly with each other synchronizing both their respective server health check states and resulting application hash table.

Under a heterogeneous software environment, and in particular, under an active-active mode of operation, both the server health check state table and resulting application hash table between the master switch 20-1 and the slave switch 20-2 may benefit from synchronization. Computer program instructions may be resident on each of the master switch 20-1 and the slave switch 20-2. The computer program instructions may provide messages across the inter-switch link 30 for coordinating synchronization between the master switch 20-1 and the slave switch 20-2. The computer program instructions may be resident on a processor 60-1 in the master switch 20-1 and on a processor 60-2 in the slave switch 20-2 or may be implemented from an external source.

During active-active operation, the ingress switch 20-1 and egress switch 20-2 may be each configured to provide independent, bi-directional packet routing while maintaining server state among the servers 26. It may be appreciated that the bi-directional servicing of the switches 20 may provide increased bandwidth processing within the data center 10. In general, the switches 20 may be configured so that a server 26 connected to one or both of the switches 20 may be enabled to receive and return traffic to the same switch 20. For example, the ingress switch 20-1 may receive a packet over the externally facing port 24 and distribute the packet traffic across the servers 26. The ingress switch 20-1 may process and route the packet to one of the servers 26 where the server 26 may perform its designated service or services. The server 26 may direct the packet back to the ingress switch 20-1 when processed. The ingress switch 20-1 may forward the packet out of the network element 14 through one or more of its externally facing ports 24. Similarly, the egress switch 20-2 may receive a packet over the externally facing port 24 and distribute the packet traffic across the servers 26. The egress switch 20-2 may process and route the packet to one of the servers 26 where the server 26 may perform its designated service or services. The server 26 may direct the packet back to the egress switch 20-2 when processed. The egress switch 20-2 may forward the packet out of the network element 14 through one or more of its externally facing ports 24.

Figure 3:
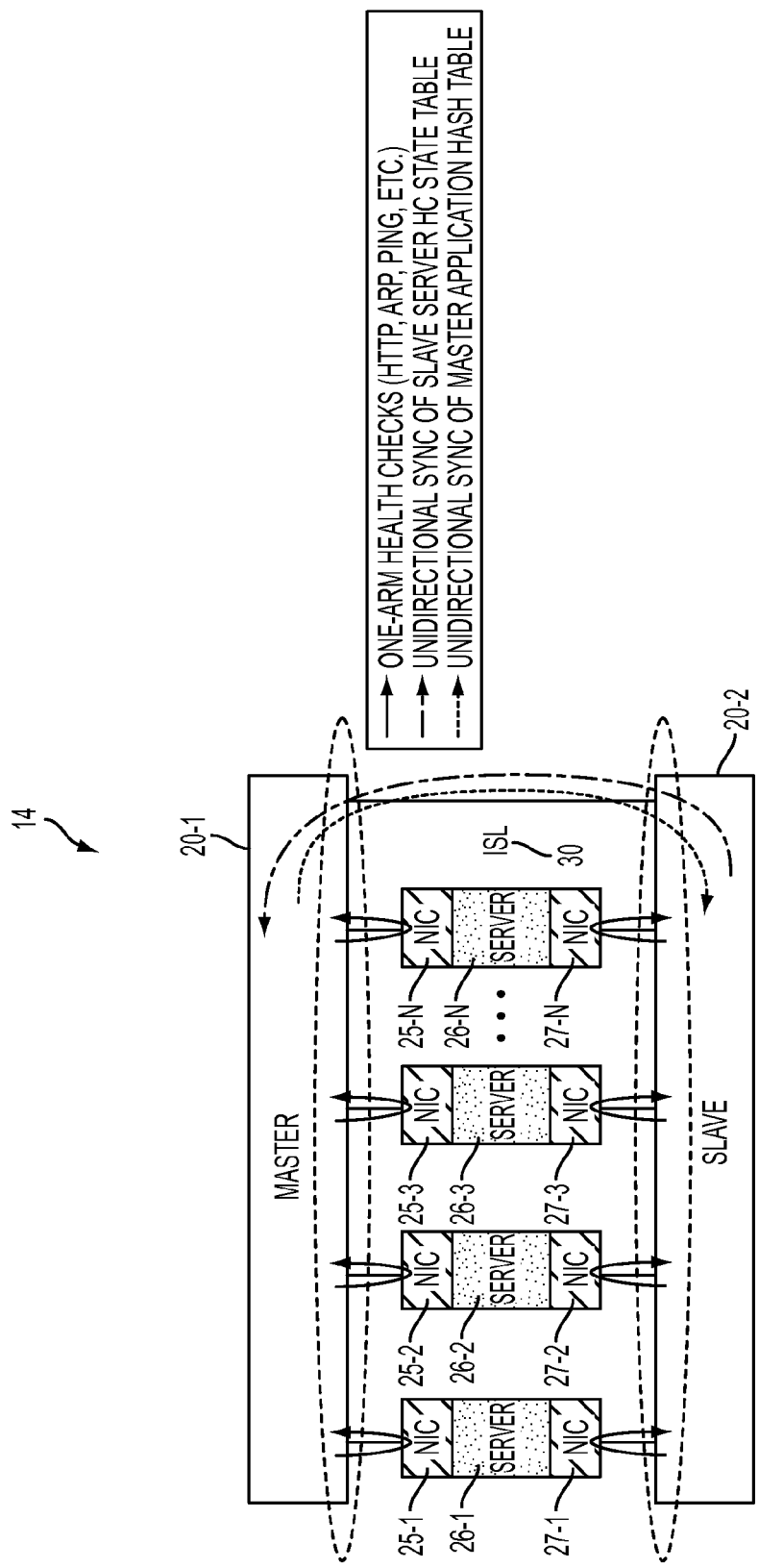
FIG. 3 is a block diagram of a process employing bi-directional synchronization enabling health checking of servers by independent switches within the network element of FIG. 2 in accordance with another exemplary embodiment of the present invention.

Referring now to FIG. 3, the network element 14 is shown according to another embodiment configured for bi-directional synchronization between the master switch 20-1 and slave switch 20-2. The network element 14 may include a plurality of servers 26-1, 26-2, 26-3, 26-N (generally 26). Each server 26 may include an ingress network interface card (NIC) 25-1, 25-2, 25-3, 25-N (generally 25) interfacing the master switch 20-1 to the servers 26. The servers 26 may also include an egress NIC 27-1, 27-2, 27-3, 27-N (generally 27)

interfacing the slave switch 20-2 to the servers 26. Each server may have a different internet protocol address which, in some embodiments, may need each NIC 25 and 27 health checked independently.

Bi-directional synchronization may be performed by configuring the switches 20-1 and 20-2 to perform server health checks independently from each other. The network element 14 may be configured to perform more than one type of health check between the master switch 20-1 and servers 26. The network element 14 may be configured to also perform more than one type of health check between the slave switch 20-2 and servers 26. In an exemplary embodiment, health checks performed by the master switch 20-1 may or may not be the same health checks performed by the slave switch 20-2 at any given time. A health check request may, for example, check whether an application running on a server 26 is functionally communicating with the switch 20 checking the application. The results of these independent health checks may be used to check for server health check status congruence which, in turn, may be used to check for application hash table congruence between the master switch 20-1 and the slave switch 20-2 via the inter-switch link 30.

Figure 4:
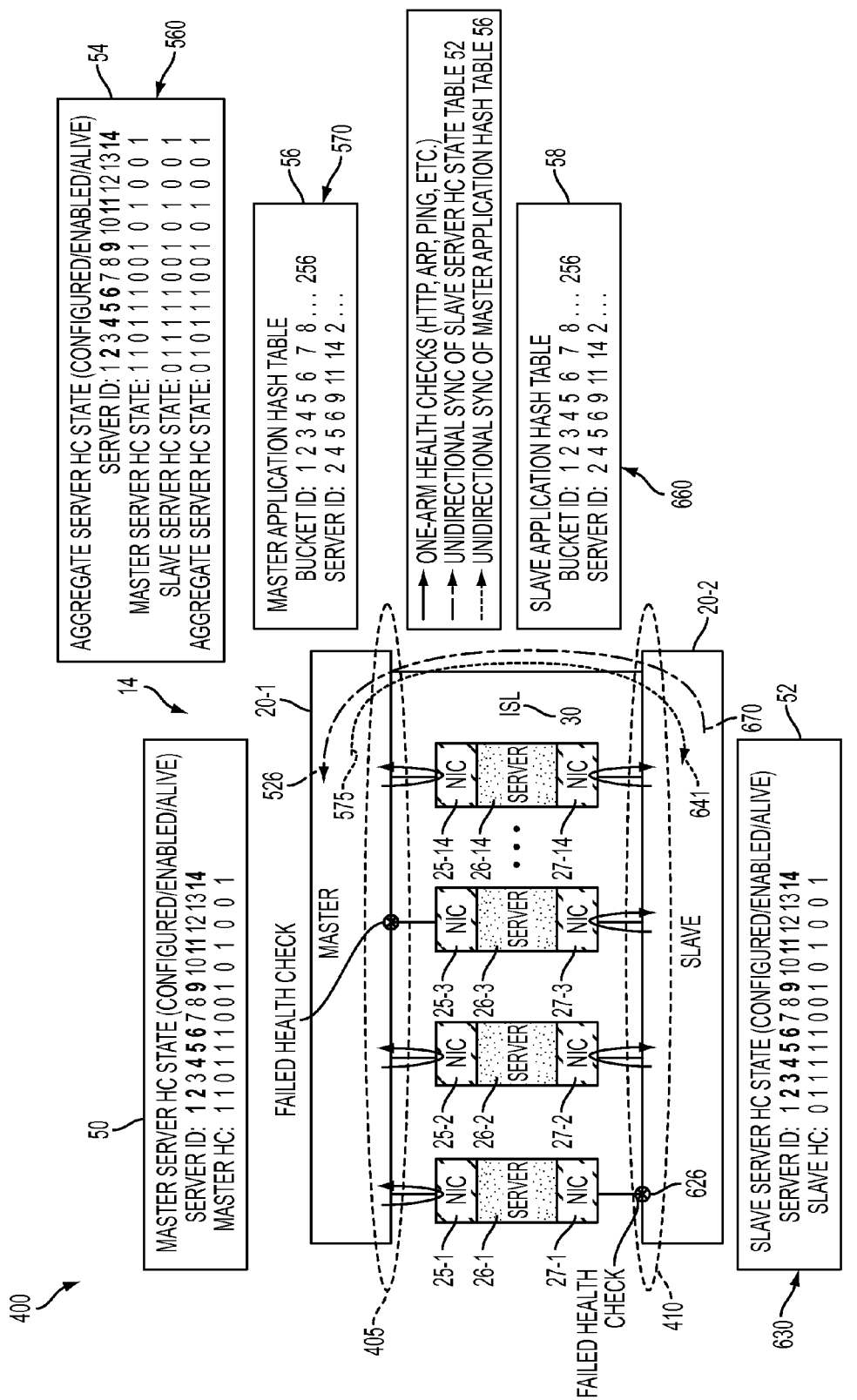
FIG. 4 is a block diagram of the process of FIG. 3 employing bi-directional synchronization enabling active-active redundancy of load-balancing switches.
Figure 5:
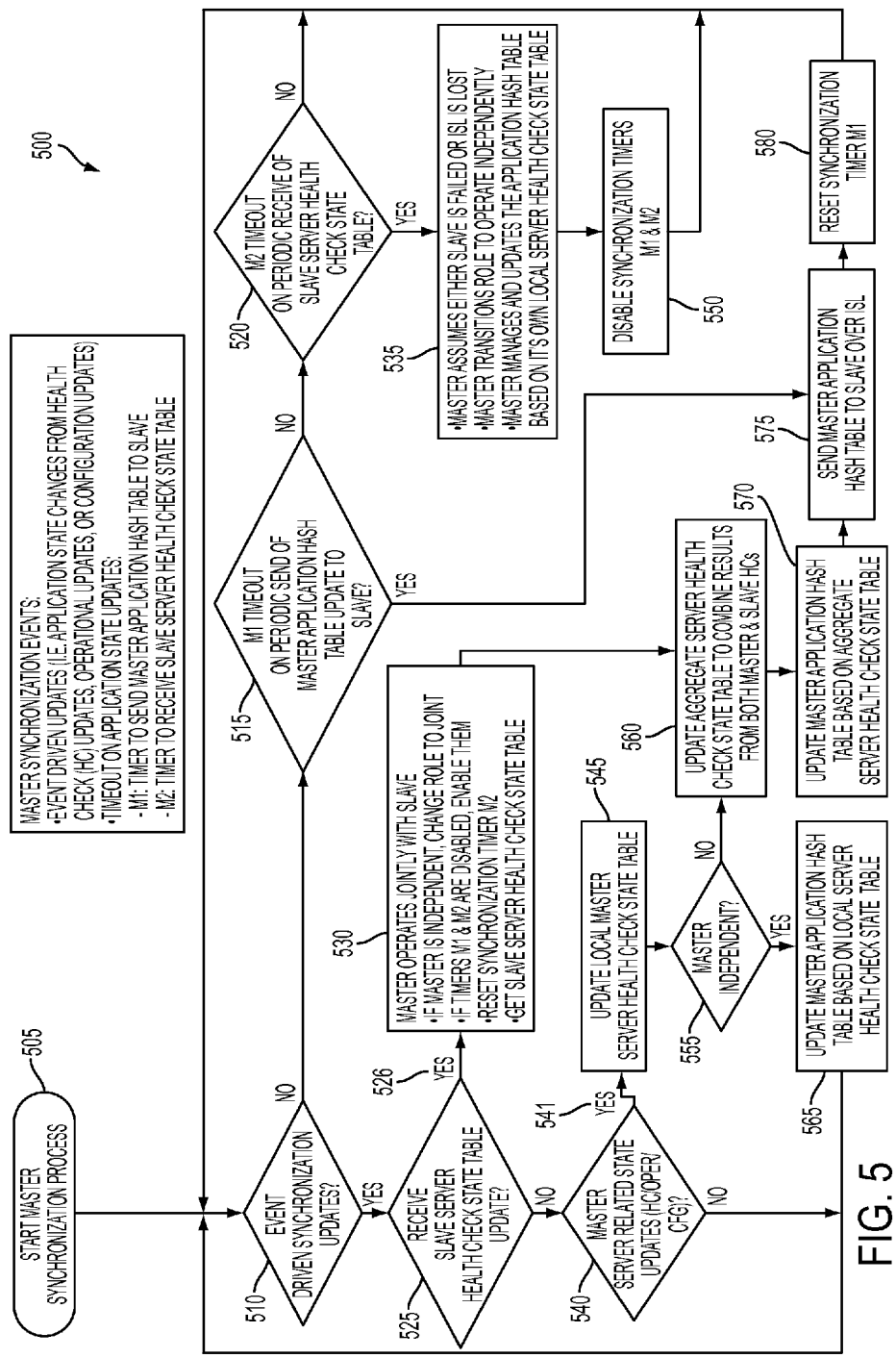
FIG. 5 is a flow chart of a process for synchronization of the master switch of FIG. 4 according to yet another exemplary embodiment of the present invention.
Figure 6:
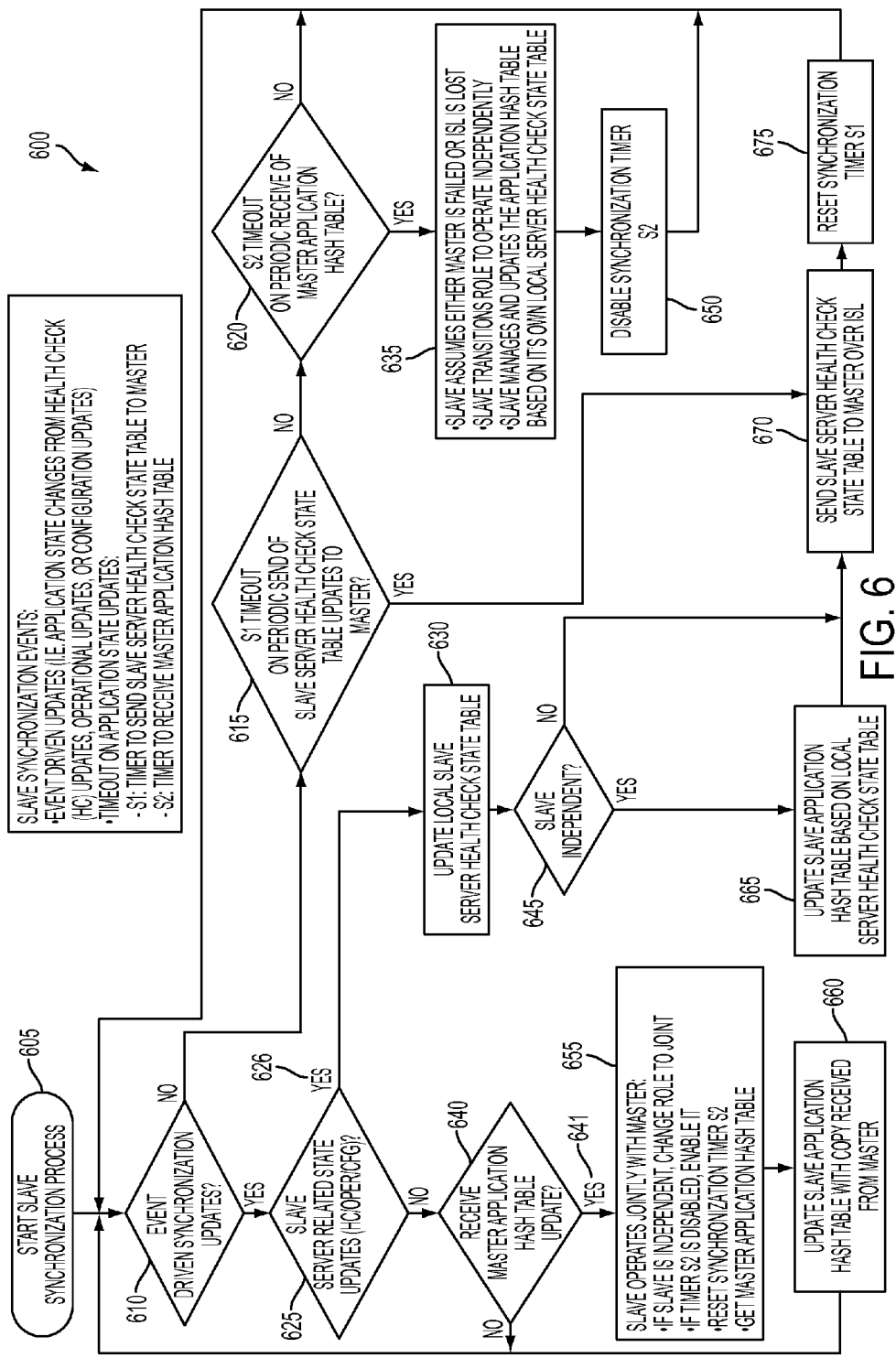
FIG. 6 is a flow chart of a process for synchronization of the slave switch of FIG. 4 according to still yet another exemplary embodiment of the present invention.

Element numbers in the following description of FIGS. 4-6, shown in parentheses, designate process steps. In FIG. 4, process steps describing bi-directional synchronization may be shown in one manner as thickened arrows. In some cases, a step may relate to multiple elements performing a similar action and are thus, encircled within a broken line; for example, elements 405 and 410. Reference numbers in the 500 and 600 series may indicate process steps of FIGS. 5 and 6 as they relate to the embodiment shown in FIG. 4.

Referring now to FIG. 4, a system 400 to bi-directionally synchronize the master switch 20-1 and the slave switch 20-2 is shown. The master switch 20-1 may send (405) periodic HTTP health check requests to all configured/enabled servers 26. In the embodiment shown, 14 servers 26 are employed which may receive the health check requests, however, it will be understood that more or less servers may be used. Upon receiving an HTTP request packet on the ingress NIC 25, each server 26 may be configured to respond to all one-ARM health checks in a hairpin fashion by sending a reply out to the same NIC 25 the request was received on. Examples of such one-ARM health check mechanisms include, but are not limited to, a link-state health check, a PING health check, an ARP (Address Resolution Protocol) health check, a UDP/TCP (User Datagram protocol/Transmission Control Protocol) health check, a service-based health check (i.e. HTTP, SMTP, SSL, SIP, etc.), and a user scriptable health check. For example, assume that the master switch 20-1 discovers via the HTTP health checks that servers 26-1, 26-2, 26-4, 26-5, 26-6, 26-9, 26-11, and 26-14 (as shown in the master server health check state table 50) are alive and healthy. In some embodiments, the health check results may only reflect the server health check states of the local switch 20 (for example, the master server health check state table 50 on the master switch 20-1) which may be different from the server health check states of the remote peer switch 20 (for example, the slave server health check state table 52 on the slave switch 20-2).

The slave switch 20-2 may also send (410) periodic HTTP health check requests to all configured/enabled servers 26. As shown, the servers 26 may receive the health check requests. Upon receiving an HTTP request packet on the ingress NIC 27, each server 26 may be configured to respond to all one-ARM health checks in a hairpin fashion by sending a reply out to the same NIC 27 the request was received on. For example, assume that the slave switch 20-2 discovers via the HTTP health checks that servers 26-2, 26-3, 26-4, 26-5, 26-6, 26-9, 26-11, and 26-14 (as shown in slave server health check state table 52) are alive and healthy. In some embodiments, the health check results may only reflect the server health check states of the local switch 20 (for example, the slave server health check state table 52 on the slave switch 20-2) which may be different from the server health check states of the remote peer switch 20 (for example, the master server health check state table 50 on the master switch 20-1).

If, on the slave switch 20-2, server related state updates (626) (which may be a result of server health check failures/recoveries, operational changes to the server state, or configuration changes to the server) are detected, the slave switch 20-2 may update (630) the slave server health check state table 52 and send (670) a copy of the slave server health check state table 52 (which may consist of a bitmap of the server 26 indices and its corresponding server health check states in relation to the slave switch 20-2) to the master switch 20-1 across the configured inter-switch link 30 communication path. Sending the copy of the slave server health check state table 52 may be performed on a periodic interval (which is configurable) as well as on an event driven basis (for example, whenever server related states change based on health check results, operational changes to enable or disable a server, or configuration updates).

Upon receiving (526) the copy of the slave server health check state table 52, the master switch 20-1 may aggregate (560) the server health check states that are common between both the master switch 20-1 and the slave switch 20-2 into an aggregate server health check state table 54. The resulting changes to the aggregate server health check state table 54 may be used by the master switch 20-1 to update (570) the master application hash table 56 of healthy servers by adding/removing the appropriate servers 26 corresponding to the aggregate server health check state table 54 differences.

The master switch 20-1 may build a copy of the master application hash table 56 referencing only the server 26 indices shown in each of the hash bucket entries. For example, the application hash table 56 may include 256 hash entry slots, however, it will be understood that a different number of hash entry slots may be available. The master switch 20-1 may then use the configured inter-switch link 30 communication path to send (575) a current copy of the master application hash table 56 to the slave switch 20-2. The application hash table update may be performed on a periodic interval (which is configurable) as well as on an event driven basis (for example, whenever server related states change based on health check results, operational changes to enable or disable a server, or configuration updates).

Upon receiving (641) the copy of the master application hash table 56, the slave switch 20-2 may execute (660) a local application hash table 58 update using the copy received from the master switch 20-1. In an exemplary embodiment, only the server 26 indices in each of the 256 hash bucket entries may be compared and used. The slave switch 20-2 may use the server 26 index as a reference to retrieve the next hop egress object information (i.e. server MAC, port, VLAN) from its local tables to perform the actual application hash table update operation.

Referring now to FIG. 5, in step (505) a process 500 for checking synchronization availability of the master switch 20-1 may be initiated. In step (510), a determination may be made as to whether an external master synchronization event is being made on the system 400. If not, in step (515) a determination for a system timeout (using timer M1, for example) on sending the master application hash table 56 to the slave switch 20-2 on a periodic interval (which is configurable) may be made. If no system timeout on timer M1 is determined, then in step (520) a determination for a system timeout (using timer M2, for example) on receiving the slave server health check state table 52 from the slave switch 20-2 on a periodic interval (which is configurable) may be made. If no system timeout on timer M2 is determined, the process may return to step (510).

If a system timeout on timer M1 is determined in step (515), then in step (575) the master switch 20-1 may use the configured inter-switch link 30 communication path to send a current copy of the master application hash table 56 to the slave switch 20-2. In step (580), the synchronization timer M1 may be reset to execute on a periodic interval (which is configurable) before returning the process to step (510).

If a system timeout on timer M2 is determined in step (520), then in step (535) the master switch 20-1 may assume that either the slave switch 20-2 is failed or the configured inter-switch link 30 communication path is lost. The master switch 20-1 may re-initialize the system 400 to operate independently from the slave switch 20-2 by changing its operational role to "independent" and managing and updating its own local application hash table 56 based on its own local server health check state table 50. In step (550), the synchronization timers M1 and M2 are disabled before returning the process to step (510).

If, in step (510), an external master synchronization event is being made, then in step (525) the determination of a slave server health check state table update may be decided. If the slave server health check state table 52 is received in step (526), the master switch 20-1 may re-initialize the system 400 in step (530) to operate jointly with the slave switch 20-2 by changing its operational role to "joint" if previously set to "independent", re-enabling timers M1 and M2 if previously disabled, resetting the synchronization timer M2 to execute on a periodic interval (which is configurable), and saving a copy of the slave server health check state table 52 just received. In step (560), the master switch 20-1 may aggregate the server health check states that are common between both the master switch 20-1 and the slave switch 20-2 into an aggregate server health check state table 54. In step (570), the resulting changes to the aggregate server health check state table 54 may be used by the master switch 20-1 to update the master application hash table 56 of healthy servers by adding/removing the appropriate servers 26 corresponding to the aggregate server health check state table 54 differences. The process continues to step (575) where the master switch 20-1 may then use the configured inter-switch link 30 communication path to send a current copy of the master application hash table 56 to the slave switch 20-2. The process further continues to step (580) where the synchronization timer M1 may be reset to execute on a periodic interval (which is configurable) before returning the process to step (510).

If, in step (525), a slave server health check state table 52 is not received, the process continues to step (540) where a determination of a master server related state update may be decided. If a master server related state update (which may be a result of server health check failures/recoveries, operational changes to the server state, or configuration changes to the server) is not determined, the process may return to step (510). If a master server related state update is determined in step (541), the master switch 20-1 may update its own local server health check state table 50 in step (545). In step (555), a determination may be made as to whether the current role of the master switch 20-1 is set to operate independently from the slave switch 20-2. If the role is set to "independent", the process continues to step (565) where the master switch 20-1 may update its local application hash table 56 based on its own local server health check state table 50 before returning the process to step (510). If not, the master switch 20-1 may be operating jointly with the slave switch 20-2 where, in step (560), the master switch 20-1 may aggregate the server health check states that are common between both the master switch 20-1 and the slave switch 20-2 into an aggregate server health check state table 54. In step (570), the resulting changes to the aggregate server health check state table 54 may be used by the master switch 20-1 to update the master application hash table 56 of healthy servers by adding/removing the appropriate servers 26 corresponding to the aggregate server health check state table 54 differences. The process continues to step (575) where the master switch 20-1 may then use the configured inter-switch link 30 communication path to send a current copy of the master application hash table 56 to the slave switch 20-2. The process further continues to step (580) where the synchronization timer M1 may be reset to execute on a periodic interval (which is configurable) before returning the process to step (510).

Referring now to FIG. 6, in step (605) a process 600 for checking synchronization availability of the slave switch 20-2 may be initiated. In step (610), a determination may be made as to whether an external slave synchronization event is being made on the system 400. If not, in step (615) a determination for a system timeout (using timer S1, for example) on sending the slave server health check state table 52 to the master switch 20-1 on a periodic interval (which is configurable) may be made. If no system timeout on timer S1 is determined, then in step (620) a determination for a system timeout (using timer S2, for example) on receiving the master application hash table 56 from the master switch 20-1 on a periodic interval (which is configurable) may be made. If no system timeout on timer S2 is determined, the process may return to step (610).

If a system timeout on timer S1 is determined in step (615), then in step (670) the slave switch 20-2 may use the configured inter-switch link 30 communication path to send a current copy of the slave server health check state table 52 to the master switch 20-1. In step (675), the synchronization timer S1 may be reset to execute on a periodic interval (which is configurable) before returning the process to step (610).

If a system timeout on timer S2 is determined in step (620), then in step (635) the slave switch 20-2 may assume that either the master switch 20-1 is failed or the configured inter-switch link 30 communication path is lost. The slave switch 20-2 may re-initialize the system 400 to operate independently from the master switch 20-1 by changing its operational role to "independent" and managing and updating its own local application hash table 58 based on its own local server health check state table 52. In step (650), the synchronization timer S2 is disabled before returning the process to step (610).

If, in step (610), an external slave synchronization event is being made, then in step (625) the determination of a slave server related state update may be decided. If a slave server related state update (which may be a result of server health check failures/recoveries, operational changes to the server state, or configuration changes to the server) is determined in step (626), the slave switch 20-2 may update its own local server health check state table 52 in step (630). In step (645), a determination may be made as to whether the current role of the slave switch 20-2 is set to operate independently from the master switch 20-1. If the role is set to "independent", the process continues to step (665) where the slave switch 20-2 may update its local application hash table 58 based on its own local server health check state table 52 before proceeding to step (670). If not, the slave switch 20-2 may be operating jointly with the master switch 20-1 and the process may proceed directly to step (670). In step (670), the slave switch 20-2 may then use the configured inter-switch link 30 communication path to send a current copy of the slave server health check state table 52 to the master switch 20-1. The process further continues to step (675) where the synchronization timer S1 may be reset to execute on a periodic interval (which is configurable) before returning the process to step (610).

If, in step (625), a slave server related state update is not determined, the process may continue to step (640) where a determination of the master application hash table update may be decided. If a master application hash table 56 is not received, the process may return to step (610). If a master application hash table 56 is received in step (641), the slave switch 20-2 may re-initialize the system 400 in step (655) to operate jointly with the master switch 20-1 by changing its operational role to "joint" if previously set to "independent", re-enabling timer S2 if previously disabled, resetting the synchronization timer S2 to execute on a periodic interval (which is configurable), and saving a copy of the master application hash table 56 just received. In step (660), the slave switch 20-2 may execute a local application hash table 58 update using the copy received from the master switch 20-1 before returning the process to step (610).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A switch in a network element, comprising:
    at least one externally facing port configured to receive data;
    a plurality of server-facing ports configured to communicate with one or more servers;
    a connection configured to communicate with another switch, wherein the connection may be outside of the one or more servers or through one of the one or more servers; and
    a processor configured to:
        exchange, through the connection, server health check states with the another switch;
        aggregate a server health check state table constructed from available servers based on a congruence of server health check states with the another switch;
        update an application hash table constructed from available servers in the aggregate server health check state table, and
        synchronize, through the connection, the application hash table with the another switch.

2. The switch of claim 1, wherein the switch is being operated under a heterogeneous software environment.

3. The switch of claim 1, wherein the switch is configured to send more than one type of health check request to the plurality of servers.

* * * * *